United States Patent [19]
Olin

[11] 3,725,780
[45] Apr. 3, 1973

[54] PORTABLE MINIATURE BULB TESTER HAVING BRISTLE BRUSHES FOR CONTACTING THE BULB TERMINALS

[76] Inventor: Richard Emil Olin, 2840 North Adams Road, Troy, Mich.

[22] Filed: Jan. 7, 1971

[21] Appl. No.: 104,712

[52] U.S. Cl............................324/51, 324/20
[51] Int. Cl.....................G01r 31/22, G01r 31/02
[58] Field of Search................324/20, 51, 54, 53

[56] References Cited

UNITED STATES PATENTS

| 2,746,011 | 5/1956 | Carson | 324/51 X |
| 3,257,610 | 6/1966 | Fariss | 324/53 |
| 1,736,605 | 11/1929 | Kreft | 324/51 |
| 1,407,693 | 2/1922 | Heany | 324/54 |
| 2,768,346 | 10/1956 | Lamont | 324/51 |
| 2,994,819 | 8/1961 | Vincent | 324/51 |
| 3,214,689 | 10/1965 | Outen | 324/51 |
| 3,416,074 | 12/1968 | Schoonover | 324/51 |
| 3,281,671 | 10/1966 | Hughson | 324/51 |

FOREIGN PATENTS OR APPLICATIONS

| 928,209 | 11/1947 | France | 324/53 |

*Primary Examiner*—Gerard R. Strecker
*Attorney*—McGlynn, Reising, Milton & Ethington

[57] ABSTRACT

A portable DC miniature bulb tester comprising a snap-open plastic case containing a conventional nine-volt battery, a snap-tab connector for the battery, and a pair of leads connecting the battery across a pair of brass bristle brushes which are accessible from the exterior of the case through an aperture in the upper shell of the case. Miniature electric bulbs of various base types may be tested by connecting the base terminals across the brushes.

7 Claims, 4 Drawing Figures

PATENTED APR 3 1973          3,725,780

INVENTOR.
Richard Emil Olin
BY
Bernard, McDlynn & Reising
ATTORNEYS

PORTABLE MINIATURE BULB TESTER HAVING BRISTLE BRUSHES FOR CONTACTING THE BULB TERMINALS

This invention relates to electric light bulb testers and particularly to a device capable of determining the operability of miniature electric light bulbs of various base types.

It is not quite popular to employ miniature incandescent bulbs for illumination purposes in various applications, the most common being the decoration of Christmas trees. These miniature incandescent bulbs generally are found in multibulb strings. Some of these strings are of the type wherein bulbs remain operative even though a bulb is burned out and some are not. In any event, after a year or more of use it is common for a number of bulbs to burn out. It is, thus, time saving and convenient to have on hand a means for determining the operability of these low-voltage miniature incandescent bulbs so that nonoperative bulbs can be identified and discarded.

A problem with the testing of miniature incandescent bulbs is that these bulbs are manufactured with various types of bases. The most common base is a small plastic push-in terminal having a small tear-drop shaped bulb inserted therein with the copper wire leads wrapped upwardly along the sides of the plastic push-in cartridge. Another somewhat more sophisticated bulb principally for outdoor applications employs a rubberized or plastic push-in cartridge which receives a bulb having a pair of spaced wire terminals. These wire terminals extend down through spaced tubes and are pulled through the tubes and wrapped up around the sides thereof similar to the above-described type. Another type of bulb has a conventional, but miniature, screw-in base with a central terminal and a peripheral threaded terminal. Bulbs of this latter type come in several different sizes including both large and small base types.

All of these miniature, incandescent bulbs are operable on voltages of approximately ten volts or less and, thus, are readily lighted using a small battery of the type typically employed in transistor radios, garage door opener transmitters, and the like.

The present invention provides means by which divers types of miniature incandescent bulbs may be readily and individually tested without the need for a plurality of sockets or other receptacles and without the need for an AC power connection. In general, this is accomplished by means of a small, battery-operated miniature bulb tester comprising a case for the containment of a low-voltage battery and a pair of spaced conductors on the case and accessible from the exterior of the case, together with means for interconnecting the battery across the contact means, whereby a low-voltage miniature bulb may be tested simply by completing a circuit through the bulb across the contact means. The term "low voltage" as used herein refers to voltages of 25 volts or less and in most cases from about 2.5 to 9 volts, this being the normal voltage for illumination of the typical miniature incandescent electric light bulb now in common use for the decoration of Christmas trees and the like.

In a preferred form, as will be hereinafter described in greater detail, the contact means of the present invention are disposed on the inner surface of a case part so as to be accessible through an aperture in the case and are constructed in the form of small, relatively stiff wire brushes having a plurality of bristles which are disposed in opposite facing relationship and spaced apart to prevent electrical shorting therebetween but such spacing being small enough so as to be easily bridged by the individual terminal portions of a miniature electric bulb. In the preferred form as hereinafter described, the battery is preferably replaceable and thus, is provided with a nondistructively removable contact of the snap-tab type as well as a plurality of molded partitions which maintain the battery in a relative snug confinement within the case. The case may be of the snap-open hinged type to facilitate access to the battery for replacement purposes.

The various features and advantages of the present invention will become more apparent upon reading the following specification which describes in detail a specific embodiment of the invention. This specification is to be taken with the accompanying drawings of which:

Figure 1:
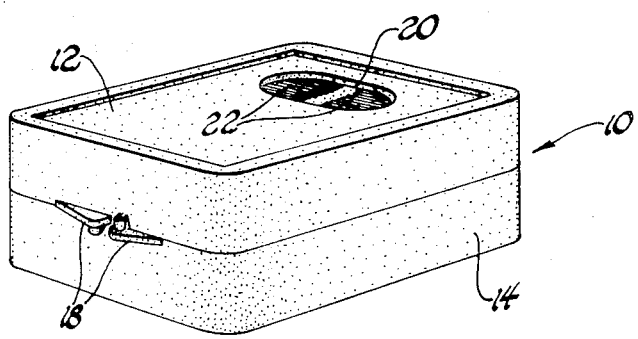
FIG. 1 is a perspective view of an illustrative embodiment of the invention showing a hinged case in the closed condition.
Figure 2:
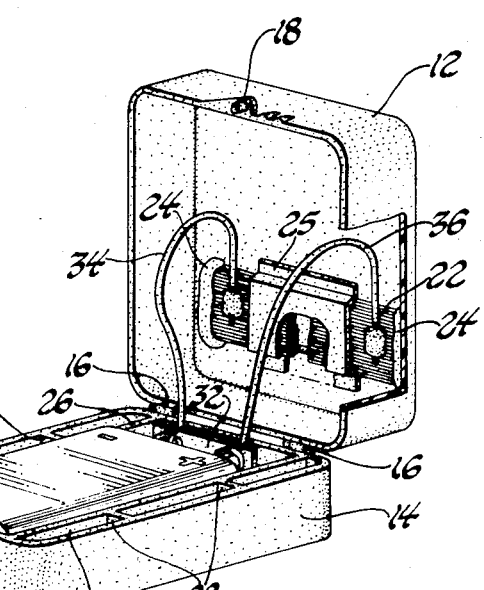
FIG. 2 is a perspective view of the embodiment of FIG. 1 showing the case in an open condition.
Figure 4:
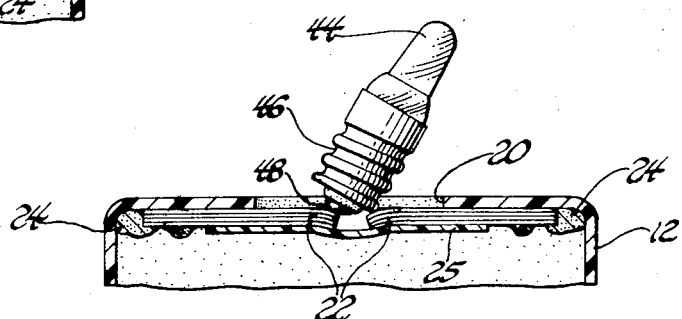

Referring to FIGS. 1 and 2, the invention is shown embodied in a portable DC powered miniature bulb tester 10 comprising a small high-impact plastic case having substantially identical shell sections 12 and 14 the exterior dimensions of which are approximately 1¾ inches wide by 2¼ inches long by ⅝ inch deep. Accordingly, the overall depth of the tester 10 is approximately 1¼ inches. The upper section 12 and the lower section 14 are provided with reversely symmetrical snap-in hinges 16 and a snap-type friction latch 18 which permits a readily opened snap lock having no moving parts. Upper shell section 12 has formed therein an elliptical aperture 20 to provide access to a pair of facing but spaced brass bristle brushes 22. The brass bristle brushes are highly conductive and are relatively stiff, the wire size and stiffness being approximately on the order of that of a small, short bristle suade shoe brush. Brushes 22 are spaced apart by approximately one-eighth of an inch or slightly less and are bonded to the inside surface of the upper case shell section 12 by epoxy cement dabs 24 as shown in FIg. 2. A tape covering 25 is preferably disposed over the bottom surface of the brushes 22 between the epoxy cement dabs 24 to prevent the brushes from being inordinately pushed in during use. The tape 25, however, leaves some resilience to the brushes 22 as indicated in FIG. 4. A small foam pad may be placed between the brushes 22 and the battery 30 in place of, or in addition to, the tape 25.

The lower case section 14 contains a conventional two terminal, snap-tab, 9-volt battery 30 of the type commonly used to power transistor radios and similar small electronic devices. The battery 30 is nestled between a pair of longitudinally extending plastic partitions 26 which are maintained in place by four spaced and laterally extending bulkheads 28. The partitions 26 and the bulkheads 28 are preferably formed integrally by injection molding or the like and may be suitably cemented in place within the lower case section 14. This operation, of course, permits the upper and lower case sections to be identical except for the aperture 20 in the upper case section 12. On the other hand, the partitions 26 and bulkheads 28 may be formed integrally with the lower case section 14 as shown.

Figure 3:
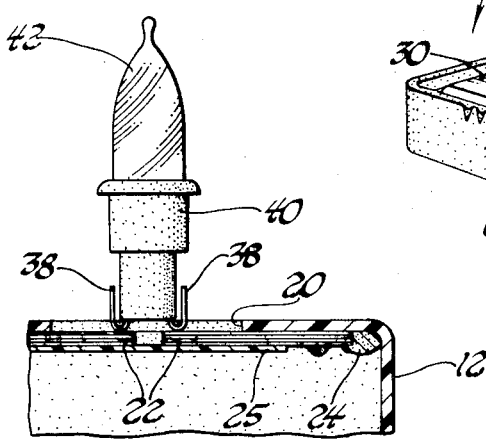
FIG. 3 is a cross sectional view illustrating the testing of one bulb type; and, FIG. 4 is a cross sectional view illustrating the testing of another bulb type.

The battery 30 is interconnected with the spaced bristle brushes 22 by means of a conventional snap-tab two-terminal connector 32 having one male and one female connector to ensure the proper polarity connection. Connector 32 is connected to a pair of 22 gauge wires 34 and 36 which in turn are electrically connected to the opposite brushes 22. It is important to adequately secure the wires 34 and 36 to the brushes 22 to ensure adequate electrical contact therewith. This operation may be accomplished by soldering or brazing as shown. Referring to FIG. 3, a conventional push-in Christmas tree bulb 42 is shown having bent up wire leads 38 and a plastic bulb receptacle 40. The bulb 42 is tested by touching the bent up wire leads across the brushes 22 as indicated in FIG. 3. Although not specifically illustrated in FIG. 3, the bulb leads 38 normally penetrate into the brush bristles somewhat to enchance the contact and electrical conductivity. FIG. 4 shows a slightly different type of miniature bulb 44 having a conventional screw-in type base 46. In FIG. 4 the bulb 44 is tested by touching the button 48 in the center of the base to one of the brushes 22 and the side of the screw in base 46 to the other of the brushes 22.

It is demonstrated in FIGS. 3 and 4 any conventional type of low-voltage miniature bulb having either spaced connector wires or conventional screw in bases of different sizes may be easily and expeditiously tested by touching the opposite conductive terminal portions of the base across the brushes 22. The resiliency and bristle-type configuration of the brushes 22 ensures a good contact between the brushes and the base of the bulb being tested regardless of the base type. Moreover, the brushes eliminate the need for a plurality of different sockets and a precision location of the bulb with respect to the tester apparatus.

It is to be understood that various changes in the apparatus illustrated herein may be made and will be apparent to those of ordinary skill in the art. For example, the plastic case may be replaced with other types of cases, however, it is preferable to use a nonconducting material so that it is not necessary to take great pains to insulate the brushes 22 from the case. In addition, it is conceivable that two or more batteries of higher or lower voltages may be employed rather than one battery as illustrated herein and further that the case may be of a permanently closed rather than a snap-open type such that when the battery is spent, the tester is simply discarded. The above description is, therefore, not to be construed in a limiting sense but rather is to be taken as merely illustrative of the invention.

The embodiments of the invention in which an exclusive property or privilege is claimed are defined as follows:

1. A hand-held battery powered test device for miniature electric bulbs comprising: a rigid case having a pair of separable shell sections of relatively thin wall and lightweight, insulative material, one section defining an interior compartment of such size and shape as to snugly receive therein a low-voltage battery having a pair of terminals, the other section having an aperture formed in one wall thereof, first and second opposed contact brushes comprising a plurality of conductive wire bristles bonded to said one wall on the interior thereof and being spaced apart so as to be externally accessible through and immediately within said aperture, resilient means disposed on the underside of said brushes for support thereof, and conductive means for connecting said battery terminals to respective contact brushes to oppositely polarize the same, said aperture being of such size as to readily accommodate the base of a miniature light bulb and to expose a substantial lateral portion of said brushes, said brushes being of such size as to receive and make multiple contact with the terminals of a miniature electric bulb and being of such weight and flexibility as to be slightly resilient under normal manual engagement with such bulbs whereby a bulb is tested by touching the terminals of said bulb across said opposed contact brushes.

2. The tester defined in claim 1 wherein the spacing between the brushes is on the order of one-eighth inch.

3. The tester defined in claim 1 wherein the shell sections comprise two mating shell sections, and means for latching the sections together.

4. The tester as defined in claim 3 wherein the sections are hinged together.

5. The tester as defined in claim 1 including connector means removably connected to the battery to permit replacement thereof.

6. The tester as defined in claim 5 including a 9-volt battery having a pair of snap-connector terminals.

7. The tester as defined in claim 1 wherein the case includes partition means for holding the battery.

* * * * *